US005873111A

United States Patent [19]

Edberg

[11] Patent Number: 5,873,111

[45] Date of Patent: Feb. 16, 1999

[54] METHOD AND SYSTEM FOR COLLATION IN A PROCESSING SYSTEM OF A VARIETY OF DISTINCT SETS OF INFORMATION

[75] Inventor: Peter Edberg, Eugene, Oreg.

[73] Assignee: Apple Computer, Inc., Cupertino, Calif.

[21] Appl. No.: 644,240

[22] Filed: May 10, 1996

[51] Int. Cl.[6] .................. G06F 17/21

[52] U.S. Cl. .................. 707/536; 704/8

[58] Field of Search .................. 707/536; 704/1, 704/7, 8, 10

[56] References Cited

U.S. PATENT DOCUMENTS

| | | |
|---|---|---|
| 5,157,606 | 10/1992 | Nagashima . |
| 5,338,976 | 8/1994 | Anwyl et al. . |
| 5,428,772 | 6/1995 | Merz . |
| 5,432,948 | 7/1995 | Davis et al. . |
| 5,440,482 | 8/1995 | Davis . |
| 5,475,587 | 12/1995 | Anick et al. . |
| 5,485,373 | 1/1996 | Davis et al. . |
| 5,523,946 | 6/1996 | Kaplan et al. . |

OTHER PUBLICATIONS

Mark Davis et al., "Unicode," 1990 Int'l Conference on Systems, Man, and Cybernetics, IEEE 1990, pp. 499–504. 1990.

"Digital Guide to Developing International Software," Digital Equipment Corp., Digital Press, 1991, pp. 1–4, 30–31, 35–40, 79–90, 107–109, 137–143, 194–200, 205–215, 259–264. 1991.

*Primary Examiner*—Paul V. Kulik

*Attorney, Agent, or Firm*—Sawyer & Associates

[57] ABSTRACT

According to the system and method disclosed herein, the present invention provides a system and method for organizing information to perform accurate and efficient collation for information such as languages of various nationalities and regions. This invention provides a number of improvements over the existing string comparison routines: portability, improved performance, ability to handle Unicode, and improved linguistic capability.

36 Claims, 10 Drawing Sheets

Begin Step 101

Get the Next Character in the String — 202

Look up the Character's Group and Class — 204

Scan the Ordered List of Character Attributes — 206

208 — Is the Character Attribute Under Group Equal to the Desired Group or Wildcard ? (Y / N)

210 — Go to Next Character Attribute Under Subcategory: Group

212 — Find Intersection: Is Character Attribute Under Class Equal to Desired Class or Wildcard ? (Y / N)

214 — Go to Next Character Attribute Under Subcategory: Class

216 — Intersection Found: Does Prefix Ordering Determine the Proper Collation ? (Y / N)

218 — Look up Corresponding Table Object

220 — Retrieve Text Element and Collation Order Information from the Appropriate Table Object End Step 101

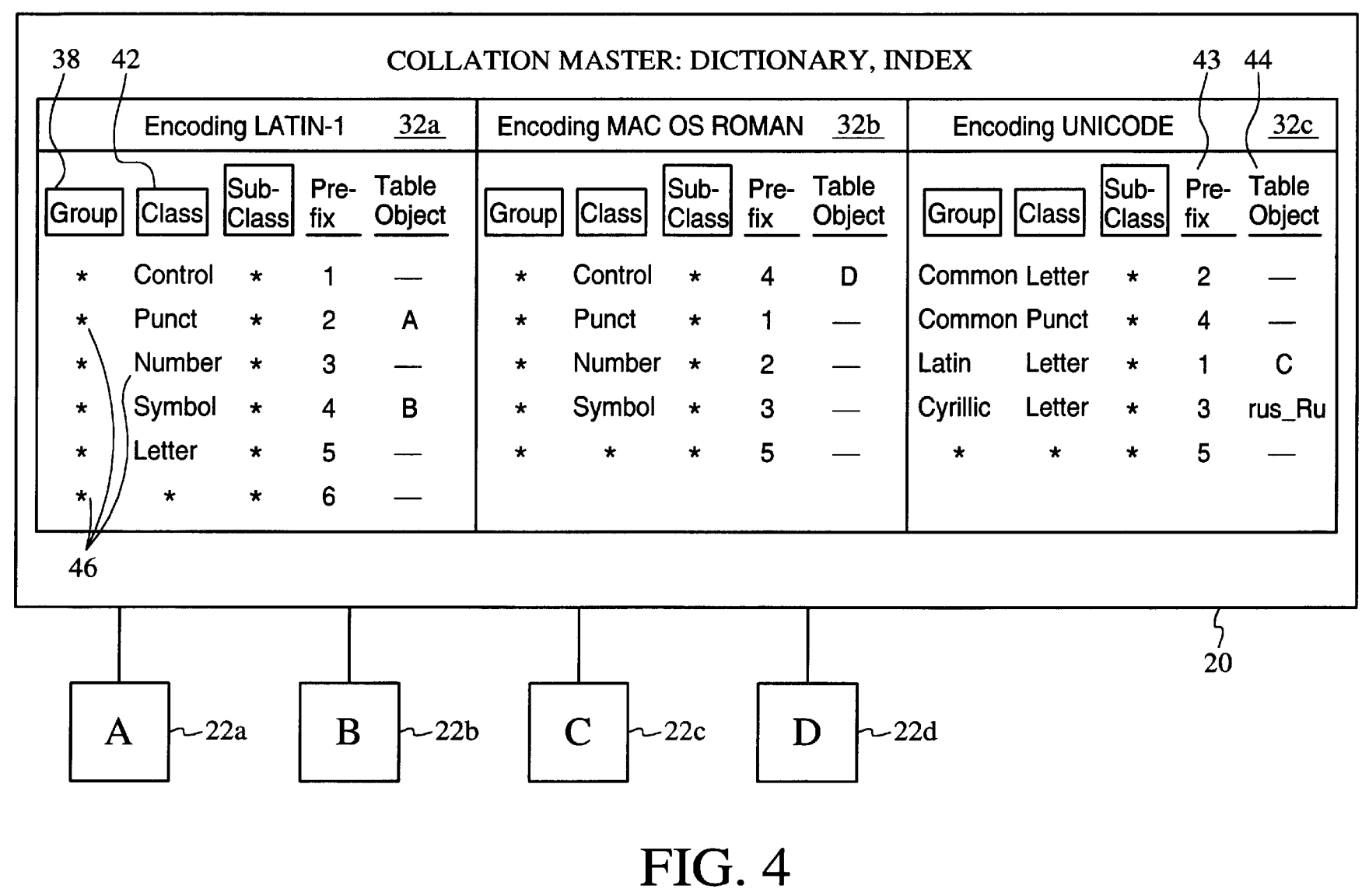

COLLATION MASTER: DICTIONARY, INDEX

Encoding LATIN-1 32a

| Group | Class | Sub-Class | Pre-fix | Table Object |
|---|---|---|---|---|
| * | Control | * | 1 | — |
| * | Punct | * | 2 | A |
| * | Number | * | 3 | — |
| * | Symbol | * | 4 | B |
| * | Letter | * | 5 | — |
| * | * | * | 6 | — |

Encoding MAC OS ROMAN 32b

| Group | Class | Sub-Class | Pre-fix | Table Object |
|---|---|---|---|---|
| * | Control | * | 4 | D |
| * | Punct | * | 1 | — |
| * | Number | * | 2 | — |
| * | Symbol | * | 3 | — |
| * | * | * | 5 | — |

Encoding UNICODE 32c

| Group | Class | Sub-Class | Pre-fix | Table Object |
|---|---|---|---|---|
| Common | Letter | * | 2 | — |
| Common | Punct | * | 4 | — |
| Latin | Letter | * | 1 | C |
| Cyrillic | Letter | * | 3 | rus_Ru |
| * | * | * | 5 | — |

FIG. 4

METHOD AND SYSTEM FOR COLLATION IN A PROCESSING SYSTEM OF A VARIETY OF DISTINCT SETS OF INFORMATION

FIELD OF THE INVENTION

The present invention relates to a method and system for collation of information in a processing system and more particularly, to a method and system for organizing collation information in a processing system for a variety of distinct sets of information.

BACKGROUND OF THE INVENTION

There is a need for collation of distinct sets of information in a processing system. As an example, the computer industry has become increasingly internationalized over the past decades. This expansion outside of the borders of the United States has been driven both by the increasing technological sophistication of foreign countries as well as the growth of large scale computer networks over which information is transferred by private individuals and multinational corporations alike. The increased global use of computer systems, and especially personal computer systems, has led to the wide-spread sale of U.S. developed operating systems which were originally developed for users who understand the English language.

For many "Made in the USA" systems, the software may only be able to handle the English letters A–Z and a–z, and may not be able to handle characters in other languages. Additionally, numeric and monetary formats typically use American conventions. Typically, software written for a United States vendor often exhibits a behavior that is biased toward the English language because that is what is hard-coded into the program logic. This usually is fine for American users, but it is not acceptable for many computer users around the world.

Americans are not alone in their tendency to produce software that is biased toward a particular culture. A German software package may produce program messages in German only. A Japanese package may handle Japanese text easily, but be unable to process other languages. Throughout the world, programmers write software that addresses local requirements. The problem comes when the users are not local.

While software that is biased toward a particular culture has never been an ideal solution for international users, several trends are making it less and less acceptable. These trends range from economic considerations to changes in system functionality to the ever-increasing use of computers in everyday life. While most computer programmers produce software that is tuned to their local needs, many computer companies sell into much more than local markets. Indeed, they may do business all over the world. Software that is biased toward a particular culture is particularly troublesome when it is desirable to connect sites from various markets. Computer networks are stretching to include different cities and even countries. However, this new functionality cannot work correctly if the different sites have made conflicting changes in software to meet local user's needs.

Code sets have developed in an effort to address part of this problem. The most popular standard sets are the ISO 8859 series. ISO 8859-1 (Latin-1) covers Western European languages; ISO 8859-2 covers Eastern European languages; ISO 8859-3 covers Southeastern European languages; ISO 8859-4 covers Northern European languages; ISO 8859-5 covers English & Cyrillic-Based languages; ISO 8859-6 covers English & Arabic; ISO 8859-7 covers English & Greek; ISO 8859-8 covers English & Hebrew; ISO/IEC 8895-9 covers Western European & Turkish; and ISO/IEC 8859-10 covers Danish, English, Estonian, Faeroes, Finnish, German, Greenlandic, Icelandic, Lappish, Latvian, Lithuanian, Norwegian, and Swedish.

Most code sets and encoding methods each support one language or a group of related languages. However, this method will be insufficient if the need for the blend of languages is more exotic. For example, the combination of French and Arabic—a common mix in Northern Africa—is a problem because one requires ISO 8859-1 (Latin-1), while the other requires ISO 8859-6. A partial solution has been an effort to combine all characters into a universal code set. The idea of a universal set is to combine every character for all commonly used scripts and languages, as well as all the symbols one would need, in one large code set called Unicode. Unicode is explained in *The Unicode Standard, World Character Encoding,* Version 1.0, Volume 1, the Unicode Consortium, Addison-Wesley Publishing Company, Inc., 1990. For further background information regarding internationalizational issues in programming, see Sandra Martin O'Donnell, *Programming for the World, A Guide to Internationalization,* PTR Prentice Hall, 1994.

The need for a system to facilitate various languages causes special problems for collation and comparison. In dealing with the field of collation and comparison, it is perhaps as important to identify the problems and organize an approach to the problems as it is to solve the problems themselves.

In order to facilitate an understanding of the related art, a brief discussion of the terms used in the field is helpful. In the world of computer standards, "collation" is usually used to refer to language-dependent ordering of strings, while "comparison" is generally used to refer to simple non-language-dependent ordering (e.g. by code order). Collation or comparisons can be applied to a "string" which is a sequence of characters. A "script" is a complete repertoire of related characters (usually letters) while "pseudo scripts" include non-letter items such as punctuation, symbols, and digits. A system used for writing will use subsets of combinations of scripts and pseudo scripts. A "repertoire of characters" is a subset of different scripts. "Ignorables" include, but are not limited to, items such as hyphens and spaces which are mostly insignificant for collation.

"Levels of significance" indicate the order of the different levels of inequality that the system checks. For instance, the first level may be an identification that "a" is different from "b"; the second level may be that "a" is different from "á"; the third level may be that "a" is different from "A"; the fourth level may be to identify differences between two strings which include ignorables.

"Expansion" refers to single characters which must be sorted as two or more characters; an example of which is Æ being sorted as a, e (unless the language treats it as a single letter, such as the Danish language). "Contraction" refers to multiple letters being treated as a single letter; an example of which is ch or ll being treated as a single unit in Spanish. A "text element" is a grouping of characters for a particular text process such as collation. Finally, a "diacritic" is a mark added to a letter that usually provides information about pronunciation or the stress that should be given to a syllable. Examples include accents and diaereses.

At first glance, collation may seem a simple task: given some sorting order for characters, walk through two strings to be compared until non-identical characters are found, then order the strings by a sort order of those characters. In fact, collation is much more complex. Even proper English sorting for a typical 8-bit character set (such as Latin-1) involves three levels of significance, ignorable characters, and expansion of some characters into multiple elements.

To illustrate the complexity of international collation issues, an overview of some collation issues for different languages is helpful.

Latin/Roman script languages

The first column below shows how a dictionary would sort the following words; the second column shows the results of a naive sort based on Latin 1 code order.

| Dictionary | Single level ordering computer |
|---|---|
| ça | Cooper |
| coop | Coors |
| co-op | co-op |
| Cooper | co-opt |
| co-opt | coop |
| coördinate | coördinate |
| Coors | o'er |
| ŒDIPUS | z |
| o'er | ça |
| z | ŒDIPUS |

The problem is not just that the code values for the characters are not assigned in proper collating order, there is virtually no possible assignment of characters to collating positions that will produce the correct result with a single-level ordering. What is needed is a multi-level ordering with ignorables and expansion: First try to order based on primary differences (c≠d); if there are no primary differences, then consider secondary differences (c≠ç); if there are no secondary differences either, then consider tertiary differences (c≠C). In addition, certain characters should be ignored completely (e.g. '-', ") unless they are the only difference between words. Finally, some characters should be expanded (at the primary level, 'Œ' should be treated as 'OE').

French adds an interesting twist. When processing accents as secondary differences, strings are compared from the end to the beginning. This produces the differences shown below:

| Incorrect (compare accents from start) | Correct (compare accents from end) |
|---|---|
| coté | côte |
| côte | coté |
| côté | côté |
| péché | pêche |
| pêche | péché |

In other languages, more than one character may be treated as a single unit for collation: traditional Spanish sorting treats 'ch' as a single letter that comes after 'c', and treats 'll' as a single letter that comes after 'l'; it also treats 'ñ' as a unique letter that comes after 'n'. This can produce sorting like: cz, ch, da, lz, ll, ma, na, nz, ña. In some languages, letters with diacritics have a sorting position completely different from the letter without diacritics. In Danish, for example, the following are treated as letters that sort after z: oe, ø, å.

More sophisticated sorting may treat "St." as Saint or Street depending on context, may treat McConnell as MacConnell, etc. This can require some semantic analysis.

Japanese.

Main body text in Japanese typically intermixes Hiragana (phonetic syllable characters) and Kanji (Chinese characters). The pronunciation of the Kanji depend on context—how they are being used. For example:

| わたくし | | ぎん | こう | | い |
|---|---|---|---|---|---|
| 私 | は | 銀 | 行 | へ | 行きます。 |
| watakushi | ha (wa) | gin | kou | he (e) | i kimasu. |

The Kanji are underlined; the other characters in large print are Hiragana. The Kanji should be sorted as if they were replaced by the Hiragana characters that represented their pronunciation; in this example these Hiragana characters are shown above the corresponding Kanji. A romanized version of the pronunciation is shown below.

One important point is that the Kanji character in the fourth and sixth positions is pronounced differently in the two places it is used in the above example, and sorting should use the correct pronunciation in each case. Most Kanji characters have multiple pronunciations that depend on context. This requires either saving the correct pronunciation of each Kanji when it is first entered, or performing a morphological analysis on the text to determine the correct pronunciation if saved phonetic information is not available.

When two different Kanji have the same pronunciation, then a secondary sorting rule is used: The Kanji are sorted according by radical and/or stroke (see description of Chinese sorting below).

Japanese also uses Katakana phonetic syllable characters. The Katakana set includes a vowel extender character; different sorting variants may either (1) treat this as an ignorable character or (2) treat this as if were the Katakana character that represents the vowel of the preceding Katakana character:

| | | |
|---|---|---|
| カア<br>ka + vowel extender | sorts as | キー<br>ka + a |
| キイ<br>ki + vowel extender | sorts as | الكاتب<br>ki + i |

Chinese

Unlike Kanji in Japanese, the standard Chinese character sorting only depends on information that can be easily derived from each character. No grammatical analysis is necessary for Chinese for collation purposes.

Korean

Korean is mainly written using a set of alphabetic characters called Jamos. These are grouped into Hangul syllables that consist of a simple or complex leading consonant (choseong), a vowel (jungseong), and optionally a simple or complex trailing consonant (jongseong). Each syllable is usually written as a single block containing its constituent jamos. Korean text may be encoded using only Jamos, or using codes for composed Hangul syllables, or both. Hangul syllables are compared as units according to their constituent jamos. The leading consonant has primary significance; the vowel has secondary significance; and a trailing consonant (if present) has tertiary significance.

Korean text may also include some Chinese characters, called Hanja in Korean. These are typically compared using one of the standard Chinese methods: radical-stroke, stroke-radical, etc.

Arabic

Most Arabic words are derived from three-consonant roots that represent a general concept of an action or state.

Various nouns, verbs, and other words related to this general concept are derived by changing vowels, doubling consonants, adding prefixes, or suffixes, etc. Short vowels are generally not written; they are generally inferred from the context (when they are written, as in religious or children's literature, they are written as marks above and below the main text; however, there are also other marks which are not vowels).

The following example shows some words derived from the k-t-b root, which has to do with writing (the short vowels in "tib", "kit", and "kataba" are not written):

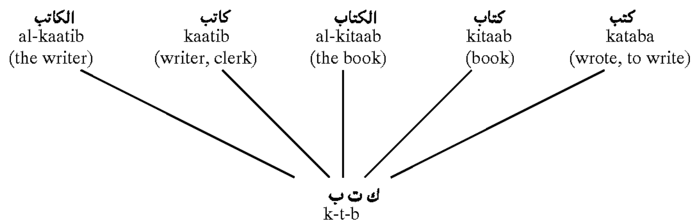

The primary level of significance for sorting is the three-consonant root. To find this from source text may require morphological analysis to strip articles, normalize inflected forms, and reduce words to their root. Short vowels are ignored in this phase, except for the information they may contribute to morphological analysis.

If there are no differences at this primary level, additional levels of significance may consider the original text, short vowels (which may be filled in by morphological analysis), etc.

Thai

For purposes of collation, Thai can be considered as a sequence of consonant clusters consisting of a consonant, an optional vowel, and an optional tone mark. Vowels are either leading vowels (which occur before the consonant) or trailing vowels (which occur after the consonant). Thai strings should be compared cluster by cluster. For each comparison, the consonant has primary significance, the vowel is secondary, and the tone mark is tertiary.

Indic scripts

The Indic scripts are also collated using consonant clusters, as with Thai. Tibetan, Burmese, and Khmer (and possibly others) have some additional complexities.

Character encoding issues

Latin letters with diacritics may be encoded in several ways, depending on the character set: as single composed characters (e.g. Lain-1) as a base letter followed by combining diacritical marks (e.g. Unicode), as a base letter preceded by combining diacritical marks (e.g. ISO 6937), or as some combination of these.

The routines used in the current systems in the art cannot generally compare strings in different character sets in a meaningful way.

The current existing collation systems typically only support three levels of significance, but many languages have more. Grouping of at least three characters is common in many languages, and Indic scripts may require larger groupings. On the other hand, a single ligature character may need to be broken into many component characters for comparison. A system capable of performing these various functions is needed.

The current systems in the art do not facilitate the ability to collect various pieces of information from multiple locations to produce a desired collation order. The current systems in the art typically require the collation information of a particular language or region to be located in a single location. This requirement poses a serious problem in modern times as the need for language systems such as Unicode grow. Since Unicode contains information regarding virtually every character used in virtually every language, it would require one huge databank of collation information for the current systems in the art to access it. However, since no one source could reasonably compile accurate information regarding all collation orders of all languages, it presents a serious limitation.

Accordingly, what is needed is a system and method for accurate and efficient collation for distinct sets of information in a processing system. More particularly, what is needed is a system and method for accurate and efficient collation for a wide variety of languages. The present invention addresses such a need.

SUMMARY OF THE INVENTION

The present invention provides a method and system for collation of a variety of distinct sets of information in a processing system. The method comprises the following steps: arranging collation information based on a category; the category being divided into a plurality of subcategories, each subcategory including at least one character attribute; providing the information for selecting the category; and selecting a result based upon an intersection of any character attribute with any other character attribute. The system further comprises a collation object within an object database with collation information organized in a table in such a way as to facilitate a selection of an intersection of a character attribute in the table with any other character attribute in the table; a collate table coupled with the collation object to facilitate retrieval of information associated with the selected intersection from the collate object; and an interface between a database engine and the collate table for optional retrieval of additional information.

According to the system and method disclosed herein, the present invention provides a system and method for organizing information to perform accurate and efficient collation for information such as strings of text according to the rules of various languages. Among other advantages, this invention provides a number of improvements over the existing string comparison routines: portability, improved performance, ability to handle Unicode, and improved linguistic capability.

BRIEF DESCRIPTION OF THE DRAWINGS

FIG. 4 is a block diagram of a sample collation master coupled with collation tables.

DESCRIPTION OF THE INVENTION

Figure 1:
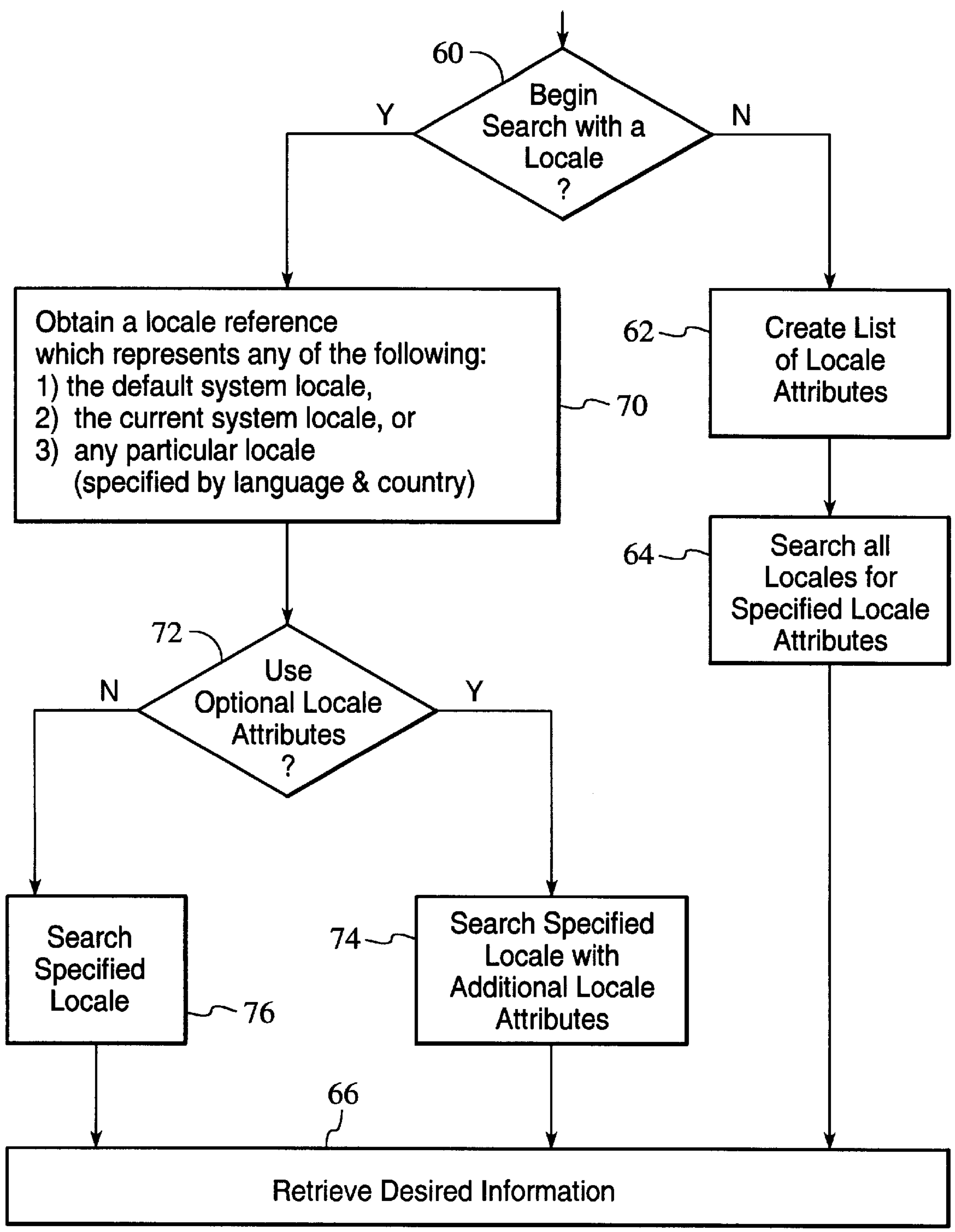
FIG. 1 is a flow diagram of two of the approaches the caller of the string collation functions can take to locate the desired information.

The present invention is devoted to an improvement in the collation of distinct sets of information. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is a system and method of organizing information in a processing system for collation of distinct sets of information such as strings of text according to the rules of various languages. It uses table formats for organizing information to obtain a result which is an intersection of different sets of information (character attributes), where an intersection is the set containing all the information common to two or more character attributes.

The present invention also presents solutions to various problems in the field of collation including, but not limited to, the problems discussed in the background. The present invention also facilitates numerous functions which the currently existing systems fail to perform.

The information for the language specific order of collation for a particular language is supplied by language-knowledgeable sources referred to as localizers. The localizers are anyone with language specific information, examples of particular issues associated with various languages are listed in the Background section. In the present invention, the localizers need not provide all the language specific information in a single source as typically required in the current state of the art. The localizers can provide the information in a plurality of sources and the present invention can locate and utilize the information. For example, the localizer with knowledge of the French language can provide information such as collation information for French. This information can be placed in a collation table for access by the present invention. A localizer with knowledge of the Japanese language can provide collation information for Japanese. This Japanese information can be placed in a separate collation table for access by the present invention. Various language information can be collected in this fashion.

One major advantage of the present invention is that it allows the information to be collected in pieces from the sources who are most knowledgeable regarding a particular language.

To more clearly describe the invention in context of a particular example, a preferred embodiment is described herein. The present invention utilizes a locale manager such as the one described in U.S. application Ser. No. 08/435,576 entitled "Retrieval of Services by Attribute," filed May 5, 1995, now abandoned in favor of U.S. application Ser. No. 08/848,543 filed Apr. 28, 1997, and U.S. application Ser. No. 08/435,372 entitled "Crossing Locale Boundaries To Provide Services," filed May 5, 1995, now U.S. Pat. No. 5,687,366, and assigned to the assignee of the present application. The information disclosed in all the patent applications cited in the present application are hereby incorporated by reference.

The locale manager provides a plurality of services where each set of services has a locale attribute stored for identifying characteristics of the function of each of the set of services. The locale manager also allows utilization of another type of attribute, referred to as character attributes, which will be later described in detail. A particular set of services can be retrieved by its locale attributes which are specified irrespective of any locale objects (locales) which may be defined in the computer system. Thus, locale attributes of most importance to a service may be used to describe it and used for retrieval of such services. Examples of locale attributes are: usage=dictionary, usage=index, usage=biography, and name=Joe's Collation Order. Dictionary, index, and biography indicate collation of information in dictionary order, index order, or biography order. Name=Joe's Collation Order is an example of a custom locale attribute instructing the system to follow the custom collation order.

Another way to retrieve a set of services is to utilize the locale arrangement of the locale manager. If the requested service does not exist in a first locale in the locale manager, then a second locale in the locale manager is scanned for the service.

FIG. 1 is a conceptual flow diagram of two of the methods used by the locale manager for retrieving an object in the collation master which may be utilized by the present invention. The collation master object can be specified directly by using only its locale attributes or indirectly by using a locale and optionally some additional standard locale attributes.

First, a caller decides whether to get an object from the collation master from a locale in step 60. If the response is no, then the caller creates a list of the custom locale attributes used to identify a particular collation master locale in step 62. The locale manager is then called up to search across all locales for the collation master object with the specified locale attributes in step 64. The collation master object is then retrieved in step 66.

If the caller wishes to retrieve a collation master object from a locale in step 60, then a locale manager function is called to obtain a reference that represents either the default system locale, the current process locale, or any particular locale specified by language and region in step 70. The caller then decides whether to use optional locale attributes in step 72. If the response is no, then the specified local e is searched in step 76. If the response is yes, then the locale manager is called to search within the specified locale for a collation master object with the additional locale attributes in step 74. Examples of additional locale attributes are dictionary sorting or index sorting. Finally, the desired information is retrieved in step 66.

Figure 2:
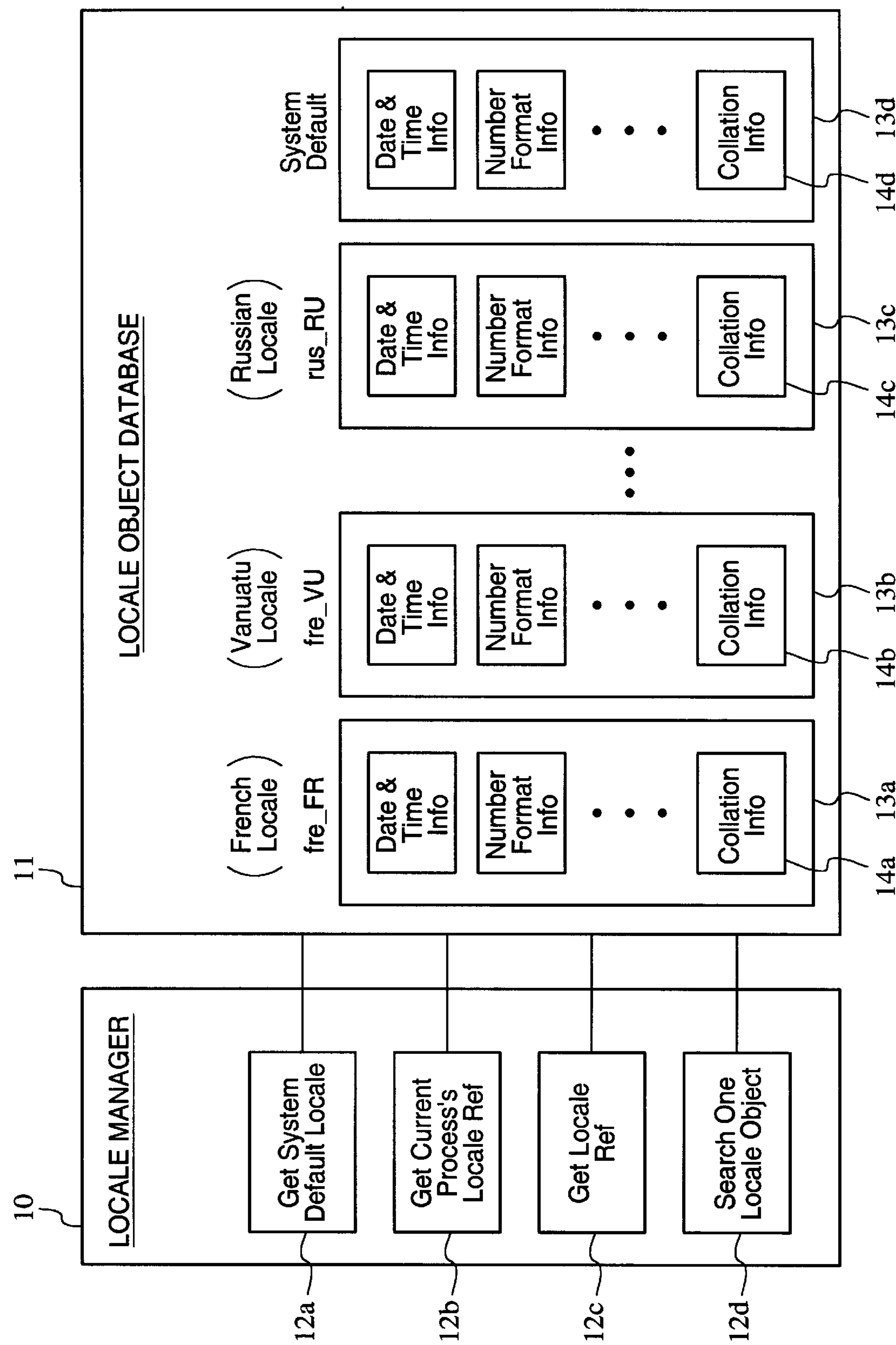
FIG. 2 is a is a block diagram of a locale manager and a locale object database.

Referring now to FIG. 2, the embodiment of the present invention can utilize the locale object database 11 as well as the locale manager functions **12*a*–12*d* as a means of accessing information in the locales 13*a*'–13*d*. The functions 12*a*–12*d* are merely the main portions of the locale manager 10 which this embodiment of the present invention preferably utilizes. For purposes of simplicity, the remainder of the locale manager is not shown. The functions 12 are located in locale manager 10 which accesses the locale object database 11. The following functions 12 are examples of possible functions which the present invention may utilize: GetSystemDefaultLocale 12***a,* GetCurrentProcessLocaleRef 12*b,* GetLocaleRef 12*c,* and SearchOneLocaleObject 12*d*. GetSystemDefaultLocale 12*a* retrieves the system default 13*d* used for the entire system. GetCurrentProcessLocaleRef 12*b* retrieves the information for a particular process such as the current process used in the system. The locale retrieved under the function GetCurrentProcessLocaleRef 12*b* can vary depending on which current process is being used. The GetLocaleRef 12*c* retrieves a specific locale reference such as the French locale 13*a*. The SearchOneLocaleObject 12*d* retrieves an object which may be in a locale 13 by specifying the locale 13 or locale attribute or both. Examples of an object which may be retrieved are collation masters 20, collate tables 22, and engines 26.

The locale object database 11 contains one or more locales 13, based on language and region. Examples of such locales 13 are the French locale 13*a* which is identified by French, France (fre_FR); Vanuatu locale 13*b,* identified by French, Vanuatu (fre_VU); and the Russian locale 13*c,* identified by Russian, Russia (rus_RU). The locale object database 11 can also have locales 13 defined by something other than language and region such as a system default 13*d*. Each of these locales 13 within the locale object manager 10 include various pieces of information such as collation information 14*a*–14*d* and preferably date, and time.

Figure 3:
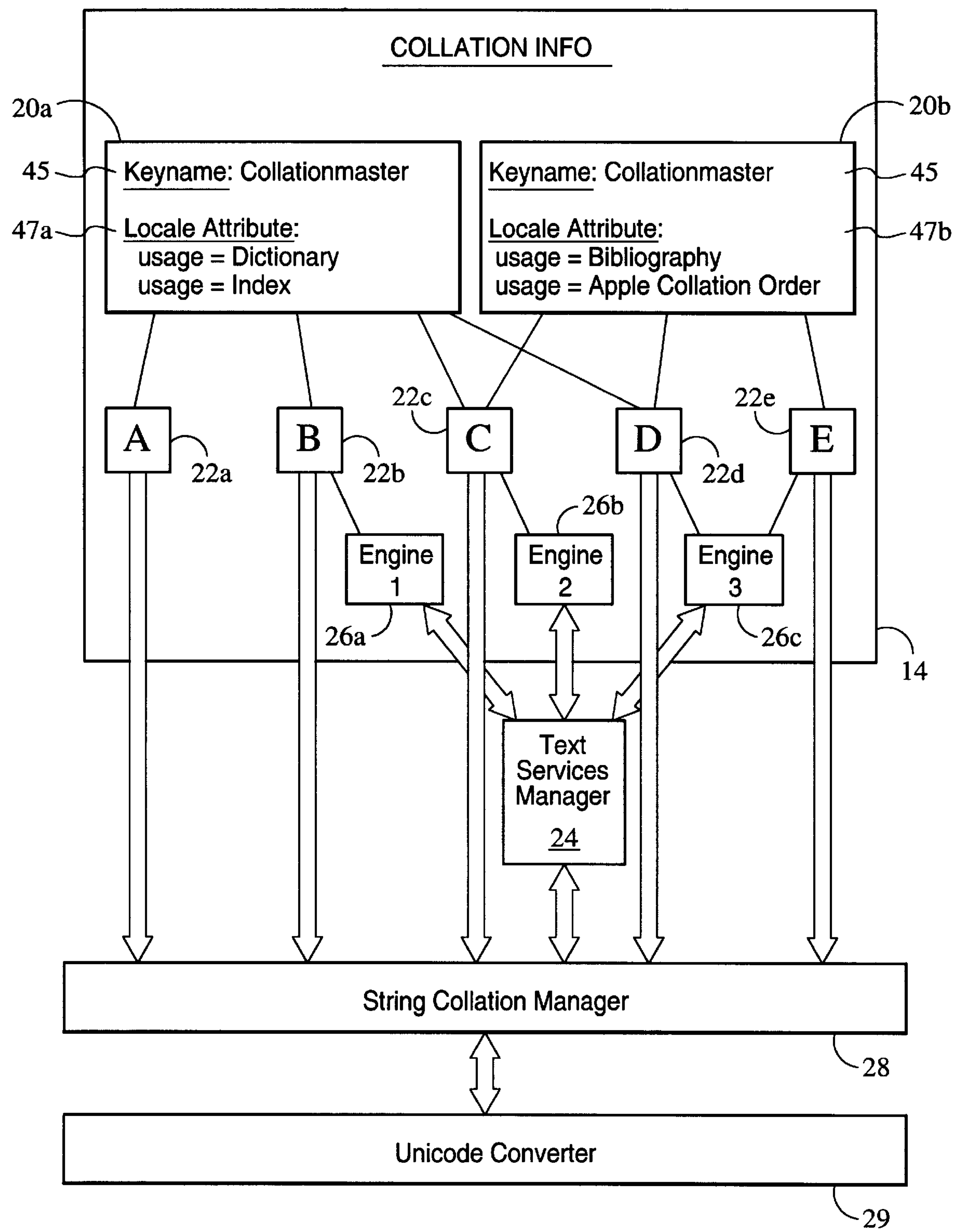
FIG. 3 is a block diagram of a collation information section coupled with text services manager and the string collation manager.

FIG. 3 is a block diagram of the preferred process and system of the collation information 14 section coupled with a text services manager 24, the string collation manager 28, and the Unicode converter 29. The string collation manager 28 collects all the information that is relevant for a desired collation order such as references to appropriate locales 13 and caller overrides. More of the basic operation of the string collation manager 28 will be discussed later in detail in conjunction with FIG. 6*a* and 6*b*. The Unicode converter 29 facilitates collation of strings of different encodings by converting a non-Unicode encoded string to Unicode when necessary. The use of the Unicode converter 29 will be discussed in detail later in conjunction with FIG. 7.

Collation information section 14 comprises one or more collation masters 20 coupled to at least one collate table 22. Any collate table 22 can be coupled to one or more engines. For example, the collation information section 14 of FIG. 3 includes collation masters 20*a* and 20*b* coupled to collate tables 22*a*–22*e*. The collate tables 22 are in turn coupled to engines 26*a*–26*c*.

The engines 26 exchange information with text services manager 24, which in turn, exchanges information with string collation manager 28. The string collation manager 28 can access the information from the collation master 20 to determine which collation table 22 to use. The string collation manager 28 can also exchange information with the Unicode converter 29 when needed in order to facilitate such functions as collation of differently encoded strings.

The objects within the collation information 14 section are identified by a key name 45 and locale attributes 47*a*–47*b*. Examples of objects within the collation information 14 section are collation master 20, collate tables 22, and engines 26. The key name of the collation masters 20 can be "collation master" 20, the key name of the collate tables 22 can be "collate table" 22, and the key name of the engines 26 can be "collation preprocessor" 26.

The locale attributes 47 of each collation master 20 varies depending on the purpose of each collation master 20. It may indicate such things as dictionary collation order, index collation order, bibliography collation order, or even a custom collation order such as Joe's collation order. A custom collation order, unlike the other collation orders, is a collation order which is not identified by language and region. Locale attributes 47 may also indicate a desired ordering of CJK "ideographic" characters. A CJK "ideographic" character is a Chinese character used in Chinese, Japanese and Korean which may represent an idea of a combination of an idea and a sound.

In this embodiment, each collation master 20 is coupled with at least one collate table 22. The collate tables 22 can hold collation information for a variety of languages. A collation master 20 may direct the string collation manager 28 to multiple collate tables 22 to collect the required information. One way of implementing this collate table 22 structure would be to use a textual standard such as Canadian standard Z243.4.1-1990 ordering requirement.

In the present invention, some of the numerous uses of the collate tables 22 are to facilitate the capability of expanding a single character into many text elements, contract multiple characters into a single text element, and specify the relative order of the text elements.

Some collation orders may require auxiliary information such as phonetic information, root-word information, expansion of abbreviations. This type of information can be accessed via the engines 26. Alternatively, some of these can be made available as an annotation in a text object. A text object specifies a string by relating information regarding the string. It can contain information regarding the text such as the language of the text the length of the string, the text itself, the encoding of the text, and possible annotations such as phonetic information.

An example of a text services manager is described in U.S. Pat. No. 5,511,193, issued Apr. 23, 1996 to Tung et al, and assigned to the assignee of the present invention. An example of management of text objects is described in copending U.S. application Ser. No. 08/435,393, entitled "Method and Apparatus for Managing Text Objects," filed on May 5, 1995, now abandoned, and U.S. application Ser. No. 08/642,059 entitled "Method and Apparatus for Managing Text Objects," filed May 3, 1996, now U.S. Pat. No. 5,802,539. Both applications are assigned to the assignee of the present invention.

The text object manager provides a method and system for providing text strings in operating systems and allowing text to be handled efficiently by an operating system. It allows text objects to be processed more efficiently among operating systems using different character sets for displaying text string. The rest may require a call to an external engine 26 to perform preprocessing.

Examples of auxiliary information which may be located in either the text objects or engines 26 include the following examples from English, Japanese, and Arabic.

In English, for some collation variants, certain abbreviations or prefixes may need to be expanded—e.g., to sort the phrase "Mt. St. Helens" as if it were written "Mount Saint Helens." A more complex operation might also be to reorder words as in some telephone book sorting orders: "The Ace Cafe" would become "Ace Cafe, The" and "John McHenry" would become "MacHenry, John".

In Japanese, it is often necessary to make a comparison using the phonetic equivalent of a string, as previously illustrated in the section entitled, "Japanese." This information may be stored as an annotation in a text object.

Arabic collation may require information about consonantal roots, as well as information about unwritten short vowels, as previously described in the section entitled, "Arabic". Again, this information may be stored as an annotation in a text object, or it may be generated by calling an appropriate morphology engine 26.

Each engine 26 can be coupled with a text services manager 24 such as the one described in copending U.S. application Ser. No. 08/644,531, entitled "Method and Apparatus for Processing Text Inputs from Multiple Input Devices in a Plurality of Applications," filed May 10, 1996, and assigned to the same assignee of the present invention. Such a text services manager 24 provides a system and method to support a plurality of textual manipulations and inputs and provide appropriate textual outputs. It readily handles textual inputs from a variety of input devices in different types of application programs processing text. Further, linguistic and stylistic aid mechanisms are also provided and available for use in a variety of application programs. This text services manager 24 supports the input of text from no-keyboard based devices and provides linguistic ad stylistic assistance mechanisms for different types of text input programs.

Both the collate tables 22 and the engines 26 can facilitate specific ordering such as bibliographic collation order, index collation order, dictionary collation order, or a custom collation order such as Joe's collation order. In the present invention, it is preferable to have the collate tables 22 fulfill virtually all of these needs for the system. However, the engines 26 can provide additional information or functions as needed. For instance, the engines 26 can be utilized to process a string of text before the string is processed by the collate tables 22. It can be used to transform a string from one form to another such as "The Ace Cafe" to "Ace Cafe, The", or transform Kanji and Hiragana mixed Japanese text into a Hiragana string. The transformed information can then be processed by the collate tables 22 for proper collation.

The text services manager 24 can be used as an interface between the string collation manager 28 and engines 26 which the system may optionally use. One of the advantages of using the text services manager 24 is being able to avoid a separate interface for each engine 26. These engines 26 can be a code module which may use a database to transform text for subsequent use. For example, a user may have the option to purchase a more complete, but expensive, version of Russian language information engine 26*a* and also have the option to select a cheaper version of a French language information engine 26*b*.

Figure 5:
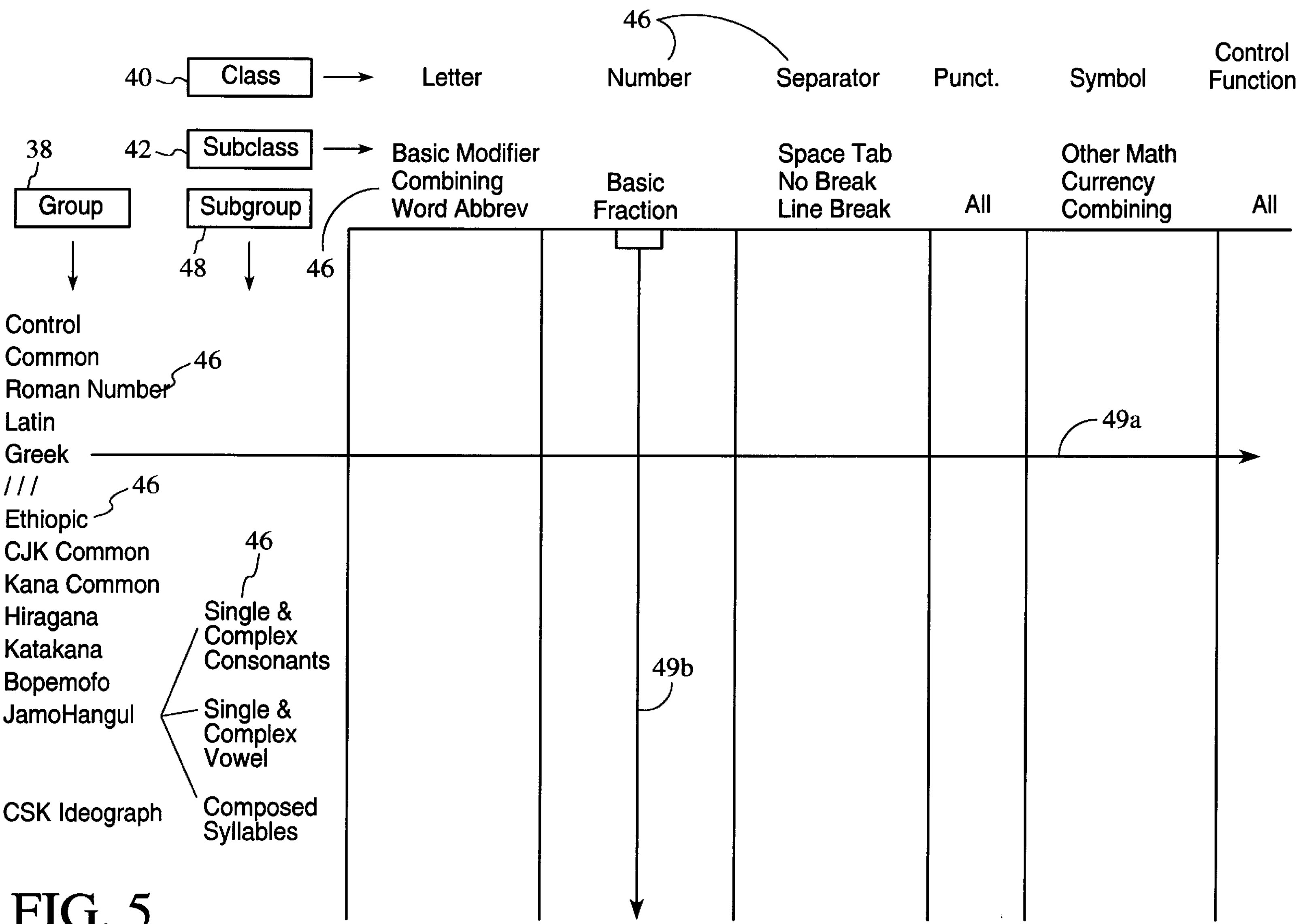
FIG. 5 is a visualization of the organizational scheme of the collation master.

FIG. 4 shows an example of a collation master 20*a* coupled to a plurality of collate tables 22*a*–22*d*. It is helpful to view FIG. 4 in light of FIG. 5. FIG. 5 is a visual aid to assist in understanding the organizational structure used in the present invention.

As shown in FIG. 4, the collation master 20 can be divided into different categories 32*a*–32*c*. One example of categories may be different methods of encoding such as Latin-1, Mac OS Roman, and Unicode. Within each category 32 of encoding, there may be several subcategories. For example, as shown in FIG. 4, group 38, class 40, and subclass 42 and possibly subgroup 48 of FIG. 5 are subcategories. Group 38 may include such information as various languages. Class 40 may include information corresponding to these languages such as numbers and punctuation. Subclass 42 may include further divisions of class 40 such as fractions and integers for numbers.

Each subcategory has at least one character attribute 46. These character attributes 46 may be organized in a particular collation order such that information located earlier in the list indicate a higher priority level of significance. For example, if "number" comes before "letter" in the order of the character attributes in class 40, then any number will be collated before any letter, such that "10" will be listed before "apple" in a list of information which has been collated by the sample ordering of category 32*a*. Alternatively, the character attributes 46 may be tagged with a prefix 43. The lower the prefix 43 of a character attribute 46, the earlier it places in the collation order. For example, in the Unicode category 32*c*, Latin letters would list before Cyrillic letters in a collation order.

The following are examples of possible character attributes 46, in an exemplary order, which may be included in group 38:

Any (wildcard)
Control
Common
Roman Numeral
Latin
Greek
Cyrillic
Armenian
Hebrew
Arabic
Indic common
Devanagari
Bengali
Gurmukhi
Gujarati
Oriya
Tamil
Telugu
Kannada
Malayalam
Sinhala
Thai
Lao
Burmese
Khmer
Tibetan
Mongolian
Georgian
Ethiopic
CJK Common
Japanese Common
Kana Common
Hiragana
Katakana
Bopomofo
Jamo Hangul
CJK Ideograph
User Defined The above list is illustrative and is not necessarily an exhaustive list.

As seen in FIG. 5, in addition to group 38, there is a type subgroup 48, which provides further information about a specific group 38. The Jamo-Hangul group, for example, might be divided into separate subgroup character attributes

46 for single and complex consonants, single and complex vowels, and composed syllables. Subgroups 48 need not necessarily be used for string comparison.

Orthogonal to group 38 is the notion of character class 40 and subclass 42. A character class 40 can include character attributes 46 which defines substantially all characters of a particular type such as letters (including syllable characters and ideographs), numbers, spaces and other separators, punctuation, symbols, and control functions. Subclasses 42 provide further information within each class 40. The following is an example of a list of character attributes 46 of class 40, in an exemplary order:

Any (wildcard)
Letter
Number
Separator (space, tab, return, line feed, etc)
Punctuation
Symbol
Control (control functions and control characters)
Undefined The above list is meant to be illustrative and is not necessarily an exhaustive list.

The following is an example of a list of character attributes 46 in subclass 42, in an exemplary order, for a list of sample character attributes 46 in class 40.

LETTER:
Any (wildcard)
Basic
Modifier
Combining
Word Abbreviation
NUMBER:
Basic
Fraction
SEPARATOR:
Space
No Break
Tab
Line Break
SYMBOL:
Other
Math
Currency
Combining The above list is illustrative and is not necessarily an exhaustive list.

These properties can be thought of as a matrix something like the one illustrated in FIG. 5. To better visualize the interactions of the subcategories, FIG. 5 illustrates a possible interaction between group 38, class 40, and subclass 42. The subcategory: group 38 includes character attributes 46 such as control, common, Roman number, Latin, Greek, Ethiopic, and such items. The subcategory: class 40, includes character attributes 46 such as letter, number, separator, punctuation, symbol, and control function. The subcategory: subclass 42, includes finer divisions of the subcategory: class 40 such as: finer divisions of letter such as basic, modifier, combining, word abbreviation; finer divisions of number such as basic and fraction; finer divisions of separator such as space, tab, no break, line break; and finer divisions of symbols such as other, math, currency, and combining.

For example, the control group 38 has characters in the tab and space subclass 42 of the separator class 40, as well as characters in the control functions class 40. The control functions class 40 also includes Unicode characters in the common group 40, such as direction overrides, and activate symmetric swapping.

The assumption is that characters within different classes 40 are preferably not intermixed in sorting. That is, it is desirable for all numbers to come before all punctuation or vice versa, and all symbols to come before all letters or vice versa. However, characters from different subclasses 42 can preferably be intermixed within a class 40. In addition to defining the particular ordering of letters, punctuation, etc. for certain groups 38, a locale 13 may define which collation orders to use for other groups 38, and an overall ordering of mixtures of groups 38 and classes 40.

With this organization of information within the collation master 20, the system may select any intersection of a character attribute 46 with any other character attribute 46. As previously mentioned in the context of the present application, an intersection is the set containing all the information common to two or more character attributes 46. This system of organization facilitates proper collation for various languages by allowing the system to access a collation system specific to a given language or region. The present invention facilitates a method and system which allows a collection of information such as collation order information for various categories or subcategories from a plurality of locations.

FIG. 5 assists in the visualization of this intersection function by displaying the subcategories in a two dimensional table. For example, following arrows 49*a* and 49*b*, if Greek was selected as the desired character attribute 46 for the subcategory: group 38, every character attribute 46 of the subcategories: class 40 and subclass 42 can also be selected (an intersection of Greek along the entire arrow 49*a* with all the letters, numbers, etc.); or one character attribute 46 of a subcategory such as number of class 40 may be selected to intersect with every character attribute 46 of the subcategory: group 38 (so that an intersection of number along the entire length of the arrow 49*b* with all the character attributes 46 of group 38); or one character attribute 46 of a subcategory such as number of class 40 may be selected in conjunction with Greek of group 38 so that the intersection of Greek and number is selected to produce numbers used in the Greek system (intersection of arrow 49*a* with arrow 49*b*). Additionally, a subset of any of these intersections is also possible.

The "*" shown in FIG. 4 indicates a wild card character attribute 46 in which any character attribute 46 under a given subcategory will suffice. The symbol "-" under the Table object 44 column indicates system default for each category 32 of encoding.

The Table Object 44 column tells the system where to find the information resulting in the intersection of character attributes 46. For example, in order to find the intersection of Latin and letters to find Latin letters, under the Unicode category 32*c*, the string collation manager 28 would turn to collate table 22C in order to get the result information. The string collation manager 28 can find Latin under the encoding Unicode category 32*c:* group 38=Latin, class 40=letter, subclass 42=wildcard (any subclass 30); and the system would direct itself to collate table 22C. Another example would be if the string collation manager 28 requires Cyrillic letters under the Unicode encoding category 32*c*, the system would turn to category Unicode 32*c:* group 38=Cyrillic, class 40=letter, any subclass 42; and the string collation manager 28 would look to the Russian locale 13*c* to find the requested information. For all other unlisted category Unicode 32*c* information requests, the system would turn to category Unicode 32*c,* group 38=*, class 40=*, subclass 42=*; and the system could look to a location such as the Unicode system default in order to find the requested information.

Figure 6A:
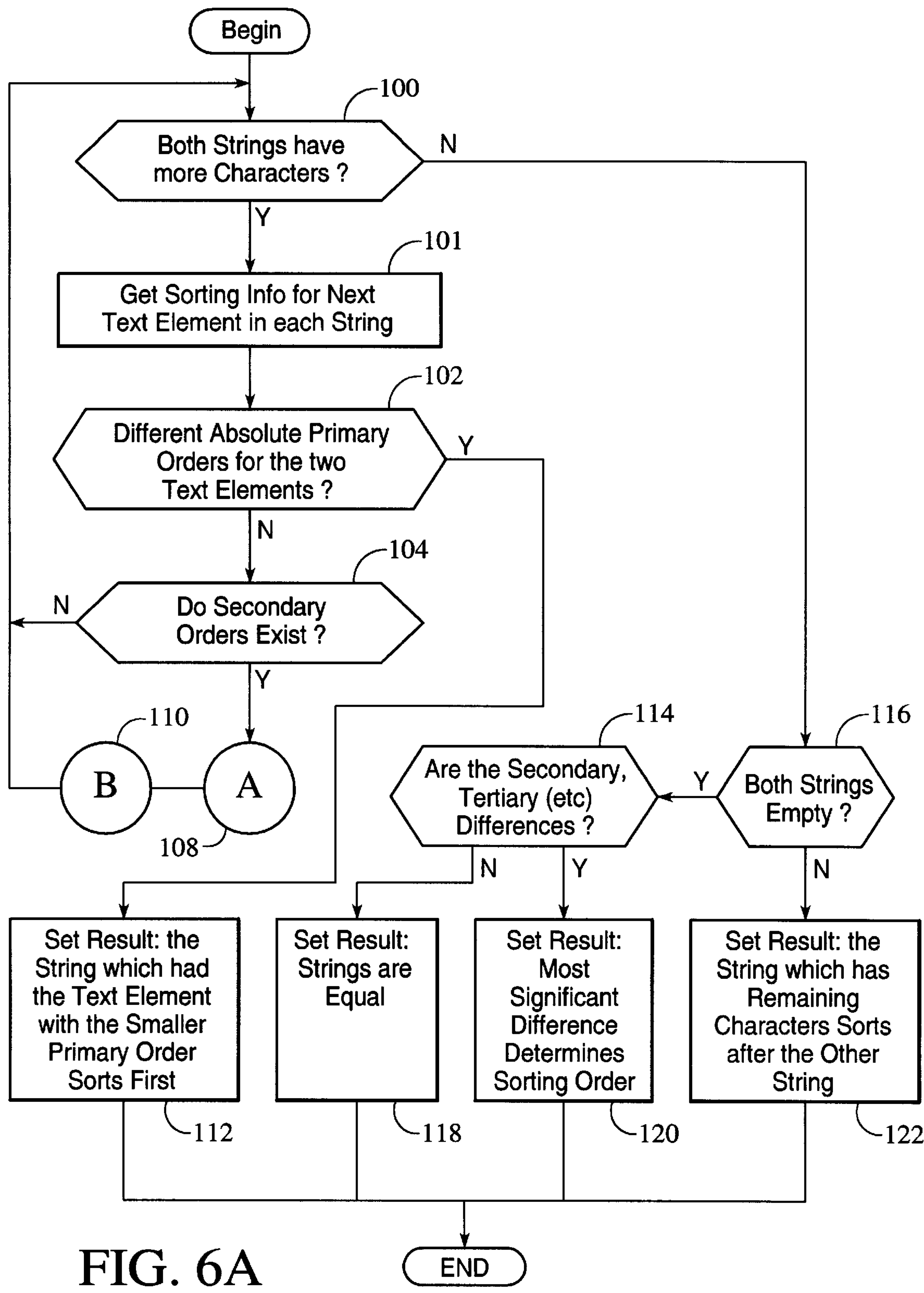
FIGS. 6A, 6B, and 6C are flow diagrams of the basic operation for obtaining a collation order followed by the string collation manager.
Figure 6B:
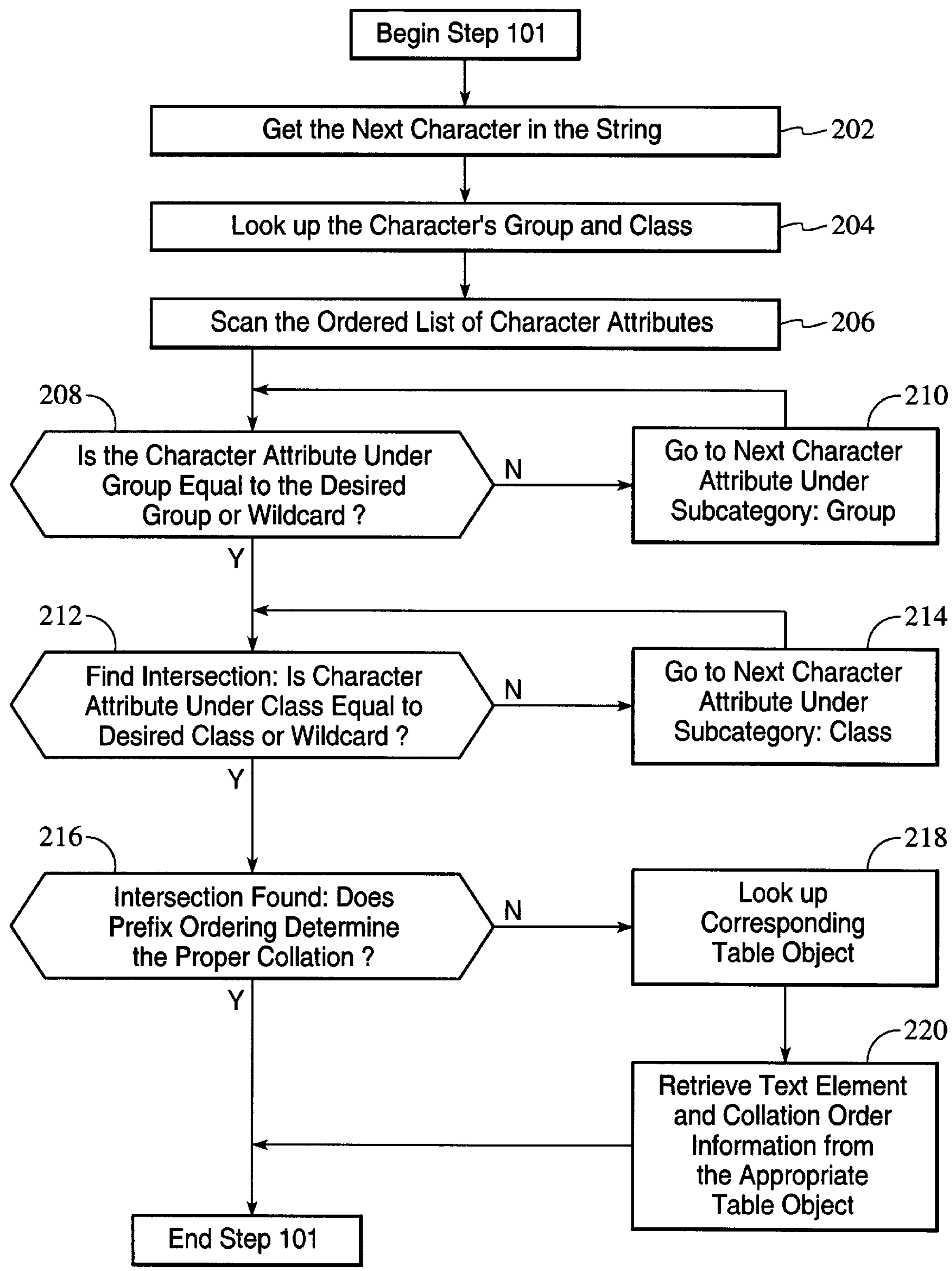
Figure 6C:
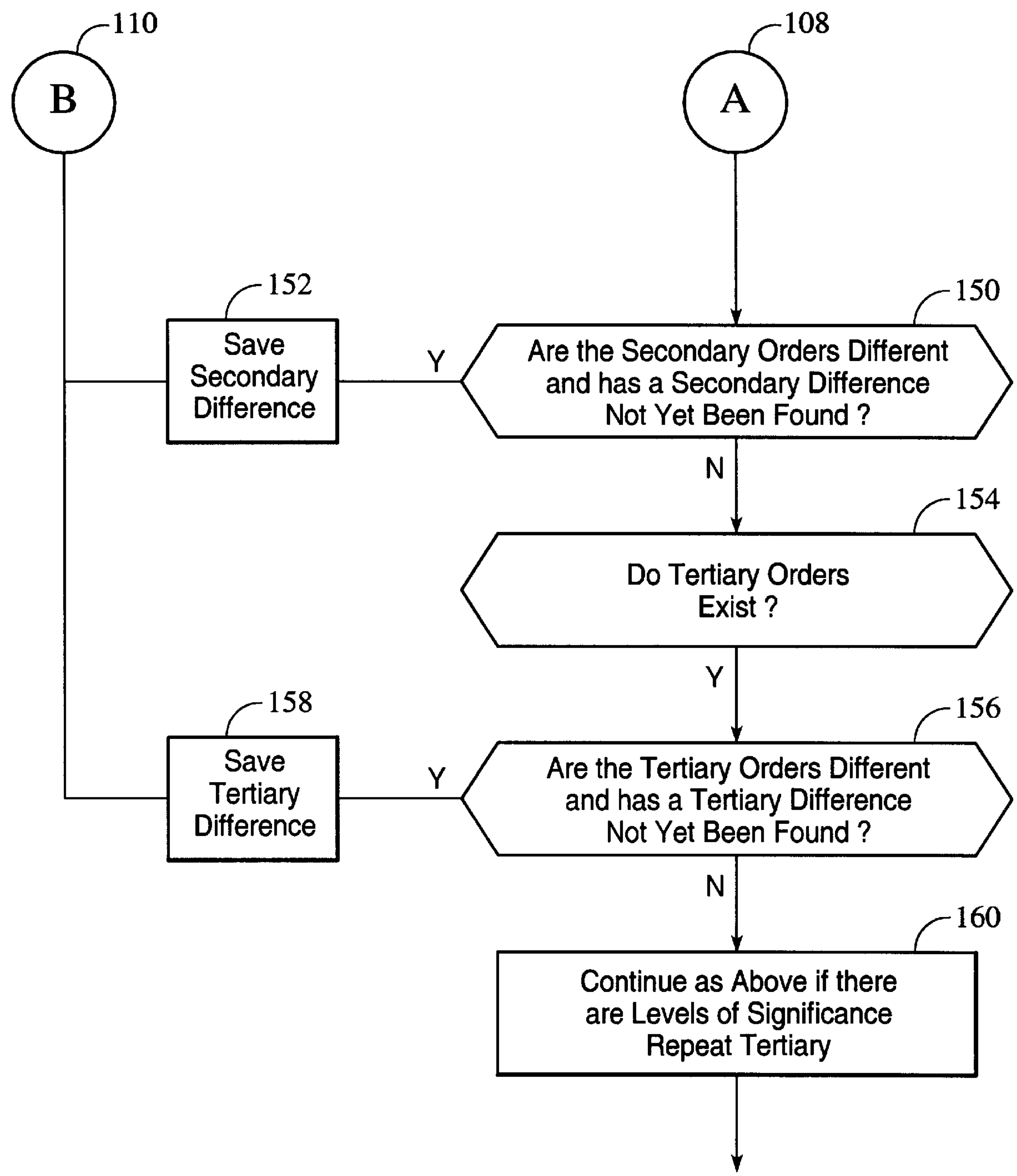

FIGS. 6A, 6B, and 6C is a conceptual flow diagram of a possible basic process followed by the string collation manager 28 to retrieve desired information for purposes such as collation of two strings. For purposes of clarity, the flow diagram of FIGS. 6A, 6B, and 6C are in the context of a specific example, however, the present invention is not limited to the example given. Many variations of this conceptual flow diagram can produce the desired result.

Assuming that the string collation manager 28 is comparing two strings for collation, it is first determined whether both strings have more characters in step 100. If the answer is no, then it is determined whether both strings are empty in step 116. If one string has characters remaining, then the collation result of the two strings is to sort the longer string after the shorter string in step 122.

If both strings are empty, then it is determined whether there are other levels of significance such as secondary or tertiary differences in step 114. As previously discussed, an example of secondary or tertiary differences are lower case verses upper case, or "a" verses "á". If there are differences in other levels of significance, then the collation result is to have the most significant difference determine the sorting order in step 120. This kind of information regarding different levels of significance can be obtained through, but are not limited to, any of the following: the collation tables 22, engines 26, the ordering of character attributes 46, or the prefix 43 order. The collation tables 22, engines 26, the ordering of the character attributes 46, and/or the prefix 43 order can also determine particular collation order such as dictionary order, index order, bibliography order, or a custom collation order. These orders may be determined by an ordering identification which allows the system to compare the values of one character to another. For example, the Latin letter a may have a smaller identification than the letter b to allow the system to compare a<b, therefore, a is sorted before b.

If there are no differences in any other levels of significance, the result of the collation order is that the strings are equal in step 118; in other words, the two words being compared are the same words.

If it is determined that both strings do have more characters in step 100 of FIG. 6A, then the string collation manager gets the sorting information for the next text element in each string in step 101. As previously discussed, a text element is a grouping of characters for a particular text process such as collation, such as "ll" in Spanish.

FIG. 6B is a more detailed flow diagram of step 101. The steps of FIG. 6B are performed on each string that is being compared. As shown in FIG. 6B, the next character in string is obtained in step 202. In this embodiment of the present invention, each character has a particular group 38 and class 40 identification which, in this particular example, is a number. For example, the character attribute 46, Latin, of group 38 may be identified by the number 8, while the character attribute 46, letter, of class 40 may be identified by the number 1. Since a wildcard may be used which would allow any character attribute 46 to intersect with anther character attribute 46 (see discussion regarding FIGS. 4 and 5), the identifier of the wildcard "any" is also used. An example of the wildcard identifier may be a number such as 0. In step 204, these identifiers of the character attributes 46 of the next character in the string are retrieved.

In step 206, the ordered list of character attributes 46 are scanned. One subcategory is preferably scanned prior to the next subcategory. For instance, the subcategory group 38 is scanned first, then the subcategory class 40 may be scanned preferably after all the group 38 subcategory has been scanned. In this embodiment, the character attributes 46 are located in the various collation masters 20, two of which are depicted in FIG. 4. In step 208, it is determined whether the character attribute 46 which is being scrutinized in the collation master 20 matches the identifier for which the string collation master 28 is searching. In this example, it is determining whether the character attribute 46 of group 38 matches either 8 or 0. If no match is found, then it proceeds to the next character attribute 46 in the subcategory group 38 in step 210. When either 8 or 0 is found as an identifier under subcategory 38, then the subcategory class 40 can searched for an identifier matching either 1 or 0 (Latin or any) in step 212.

If the desired identifier is not found, 1 or 0 in this case, then the next character attribute 46 of subcategory class 40 is searched in step 214. The character attributes 26 of subcategory class 40 is scanned in this manner until a match is found. When a match is found, the string collation manager 28 has found an intersection of the two character attributes 46, Latin and letter.

Once the intersection is found, it is determined whether the prefix 43 (shown in FIG. 4) ordering determines the proper collation in step 216. For example, if both the characters being compared from the two strings are Latin letters, the prefix 43 ordering would not determine proper collation since the prefix 43 would be the same for both characters. If the prefix 43 does not determine the proper collation, then the proper collation information can be retrieved by utilizing other means, for example, the collation tables 22 or engines 26. If, however, one character is a Latin letter, but the other character is a Cyrillic letter, assuming the category is Unicode encoding 32*c,* then the prefix 43 would determine the collation order as the Latin letter being sorted before the Cyrillic letter.

If the prefix ordering does not determine the proper collation order, then the corresponding table object 44 (shown in FIG. 4) is searched in step 218. The corresponding table object 44 tells the string collation manager 28 where to locate the desired information. For example, if both the characters being compared are Latin letters under the Unicode encoding 32*c* category, then the table object 44 indicates collation table 22C to obtain the desired information which may be the collation order and text element information. Text element information determines whether an "l" should be collated as a complete text element or whether it needs to be collated as "ll" because the collation order required may be the Spanish collation order in which "ll" can be a complete text element (see Background discussion regarding issues with different languages). This kind of information such as collation order and text element information is retrieved from the table object in step 220.

Once the information is retrieved in step 220, or the collation order is determined by the prefix in step 216, then the system is ready for step 102 which is depicted in FIG. 6A.

FIG. 6A shows step 102 in which it is determined whether there is a difference in absolute primary orders for the two text elements, otherwise referred to as "primary difference". As previously discussed, "levels of significance" indicate the order of the different levels of inequality that the system checks. For instance, the first level may be an identification that a is different from b; the second level may be that a is different from á; the third level may be that a is different from A; the fourth level may be to identify differences between two strings which are ignorables. The first level of significance is also known as the primary difference, the second level is also known as the secondary difference, the third level is known as the tertiary difference, and so on. Text elements or characters have different values for each level of significance to allow the sort ordering to be determined. For example, "a" will have an earlier sorting order than "b": "a" may equal 1, while "b" equals 2 so the system can determine that 1<2 so the text element with the lower value sorts before the text element with the higher value.

If there is a primary difference between the two text elements found in step 102, then the collation result is that the string which has the text element with the larger absolute primary order sorts after the other string. If no primary difference is found in step 102, then it is determined if secondary differences exists in step 104. If no secondary orders exist, then the system returns to step 100 and checks to see if both strings have more characters and continues with the procedure until a result is reached.

If secondary orders exist, then the process continues in FIG. 6C via step 108. It is determined if the secondary orders are different in step 150. If the secondary orders are different and a secondary difference has not yet been found, then the secondary difference is saved in step 152. If the secondary orders are the same or a secondary difference has already been found, then it is determined if a tertiary order exists in step 154. If so, then it is determined if the tertiary orders are different in step 156. If they are different, then the difference is saved in step 158. These saved differences can later be used in step 114. If the tertiary orders are different and a tertiary difference has not yet been found, then the steps of determining and saving differences of levels of significance continues if there are levels of significance beyond tertiary in step 160. The system continues to check for differences in higher levels of significance, if they exist, until no more levels of significance exists.

Figure 7:
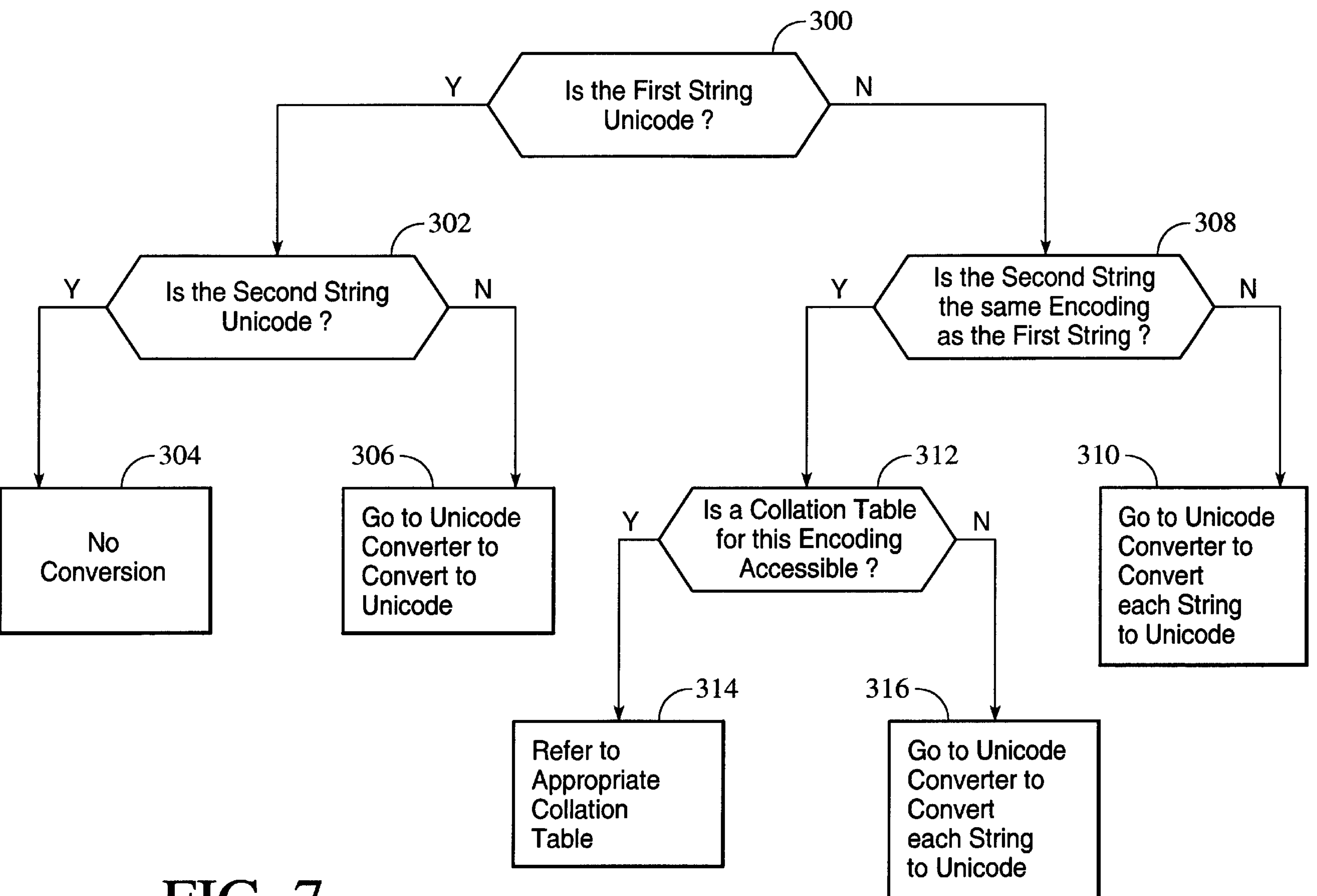
FIG. 7 is a flow diagram of an example of the use of the Unicode converter.

Referring now to FIG. 7, what is shown is a flow diagram of an example of the use of the Unicode converter 29. The Unicode converter 29 facilitates functions such as comparison of strings which use a mixture of encodings. In some cases, this mixture of encodings may require a code conversion utilizing the Unicode converter 29 such as the one disclosed in U.S. application Ser. No. 08/527827, entitled "Bidirectional Code Converter", filed Sep. 13, 1995 now U.S. Pat. No. 5,784,069; U.S. application Ser. No. 08/527438, entitled "Unicode Converter", filed Sep. 13, 1995 now U.S. Pat. No. 5,793,381; U.S. application Ser. No. 08/527837, entitled "Context-Based Code Converter", filed Sep. 13, 1995 now U.S. Pat. No. 5,784,071; and U.S. application Ser. No. 08/527831, entitled "Code Converter with Truncation Processing", also filed Sep. 13, 1995, now U.S. Pat. No. 5,682,158. The Unicode converter uses a code conversion technique that provides high fidelity conversion of information, while ensuring that the resulting character codes are interchangeable with other platforms. When source text can be converted to target text and then back again to the original source text, the process is considered to have high fidelity conversion of information. The code conversion system is able to map a single source character or a sequence of characters to either a single target character or a sequence of target characters. The code conversion is particularly useful for converting Unicode characters from other character sets.

As seen in FIG. 7, in this embodiment, the string collation manager 28 determines if the first string to be compared is encoded in Unicode in step 300. If so, then it is determined if the second string to be compared is encoded in Unicode in step 302. If the second string is also encoded in Unicode, then no conversion is necessary for the comparison in step 304 and the string comparison as illustrated in FIG. 6A and 6B can commence. If the second string is not encoded in Unicode, it may be encoded in Latin-1 for example, then the Unicode converter can be utilized to convert the string to Unicode in step 306.

If the first string is not encoded in Unicode, then step 308 is to determine if the second string uses the same encoding as the first string. If not, then the string collation manager 28 can utilize the Unicode converter 29 to convert both strings to Unicode in step 310. If the second string uses the same encoding as the first string, then it is determined if a collation table 22 exists for this encoding in step 312. If there is a collation table 22 for this encoding available, then the appropriate collation table 22 can be referred to for the required collation information. However, if no collation table 22 exists for this encoding, then the Unicode converter 29 can be used to convert both strings to Unicode in step 316.

Figure 8:
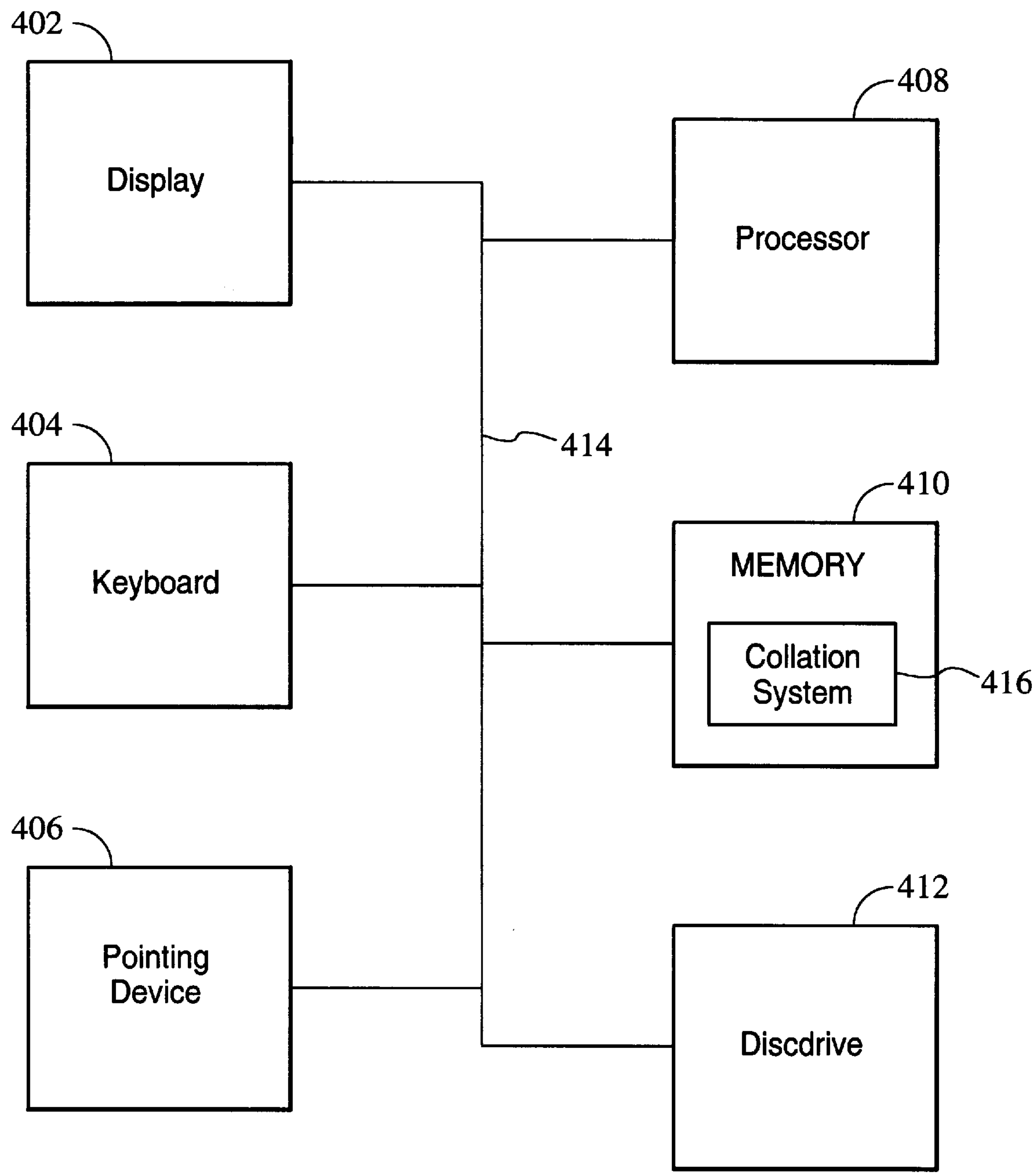
FIG. 8 is a block diagram illustrating a conventional computer system.

FIG. 8 is a block diagram illustrating a conventional computer system 400, which includes a display 402, a keyboard 404, a pointing device 406, a processor 408, a memory 410, and a discdrive 412 which are all connected by a bus 414. The processor 408 operates in conjunction with the memory 410 to execute a collation system 416 that can enable a user to collate distinct sets of information such as text strings following the rules of various languages. In a preferred embodiment, the collation system may be loaded onto the computer system via the discdrive 412 or a network.

A method and system has been disclosed for a system and method for accurate and efficient collation for languages of various nationalities and regions. Software written according to the present invention is to be stored in some form of computer-readable medium, such as memory, diskette, or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of organizing information for collating in a processing system which includes collation information, the method comprising:

a) arranging the collation information based on a category, the category being divided into a plurality of subcategories, each of the plurality of subcategories including an attribute;

b) providing the information for selecting the category and c) selecting a result based upon an intersection of any attribute with any other attribute.

2. The method of claim 1, wherein the result is based upon any of the following: an intersection of an attribute from a first sub-category and all the attributes from a second subcategory; an intersection of an attribute from the second subcategory and all the attributes from the first subcategory; and an intersection of an attribute from the first subcategory and an attribute from the second subcategory.

3. The method of claim 1, wherein, the category is encoding information.

4. The method of claim 3, wherein the category is Unicode.

5. The method of claim 1, wherein the subcategory of is further divided into additional subcategories which can have additional attributes.

6. The method of claim 1, wherein the attribute of the subcategory is further divided into additional attributes.

7. The method of claim 1, further comprising the step of retrieving the result.

8. The method of claim 1, wherein the result information is organized in a table format within a database.

9. The method of claim 1, wherein a subcategory includes characters of a particular type.

10. The method of claim 1, wherein the subcategories include a plurality of attributes in a pre-defined order of collation.

11. A method in a processing system to allow information to be organized for collation, comprising:

a) selecting a character attribute in a table to intersect with another character attribute in the table;

b) accessing an interface to a plurality of database engines containing information related to the intersection of the selected attributes for retrieval; and c) retrieving the information related to the intersection of the selected character attributes from a collation database.

12. The method of claim 11, wherein the character attributes in the table are organized in a pre-defined order of collation.

13. A method of organizing information for collating in a processing system which includes collation information, the method comprising:

a) arranging the collation information in a table format which includes collation order information;

b) selecting the collation order information for a particular set of characters;

c) accessing collation tables to retrieve the selected collation order information, the table format for facilitating selecting an intersection of attributes in the collating tables; and d) using an interface for a database engine to retrieve additional information related to the selected collation order information.

14. A method of organizing information for collating in a processing system utilizing a locale object database, the method comprising:

a) arranging the locale object database in a table format;

b) selecting a locale from the locale object database;

c) selecting a collation order within the locale;

d) selecting an attribute associated with a set of characters within the collation order for obtaining an intersection of one of the selected attributes with another of the selected attributes; and e) accessing collation tables and an interface to a database engine to retrieve the collation order if the attributes are not tagged with a prefix or the prefix does not properly determine the collation order, the table format for facilitating selecting the intersection of the attributes in the collating tables.

15. The method of claim 14, wherein the locale is identified by language and region.

16. The method of claim 14, wherein the collation order is a customized order of collation.

17. A processing system to allow information to be organized for collation, comprising:

a collation object within an object database with collation information organized in a table so as to facilitate a selection of an intersection of an attribute in the table with any other attribute in the table;

a collate table coupled with the collation object to facilitate retrieval of information associated with the selected intersection from the collate object; and an interface between a database engine and the collate table for optimal retrieval of additional information.

18. The system of claim 17, wherein the collation object is located within a locale object, the locale object being identified by language and region.

19. A computer readable medium including program instructions for organizing information for collation in a processing system which includes collation information, the program instructions for:

a) arranging the collation information based on a category, the category being divided into a plurality of subcategories, each of the plurality of subcategories including an attribute;

b) providing the information for selecting the category; and c) selecting a result based upon an intersection of any attribute with any other attribute.

20. The computer readable medium of claim 19, wherein the result is based upon any of the following: an intersection of an attribute from a first subcategory and all the attributes from a second subcategory; an intersection of an attribute from the second subcategory and all the attributes from the first subcategory; and an intersection of an attribute from the first subcategory and an attribute from the second subcategory.

21. The computer readable medium of claim 19, wherein the sub-category is further divided into additional subcategories which can have additional attributes.

22. The computer readable medium of claim 19, wherein the attribute of the subcategory is further divided into additional attributes.

23. The computer readable medium of claim 19, further comprising a step (c) of utilizing an interface for retrieving the result.

24. The computer readable medium of claim 19, wherein the subcategories include a plurality of attributes in a predefined order of collation.

25. The computer readable medium of claim 24, wherein the order of collation approximates the order of collation used in dictionaries.

26. The computer readable medium of claim 24, wherein the order of collation approximates the order of collation used in phone books.

27. The computer readable medium of claim 24, wherein the order of collation approximates the order of collation used in indexes.

28. The computer readable medium of claim 24, wherein the order of collation approximates the order of collation used in bibliographies.

29. The computer readable medium of claim 24, wherein the order of collation is a customized order.

30. A computer readable medium including program instructions for allowing information to be organized for collation, the program instructions for:

a) selecting a character attribute in a table to intersect with another character attribute in the table;

b) accessing an interface for a plurality of database engines containing information related to the intersection of the selected character attributes for retrieval;

c) retrieving the information related to the intersection of the selected character attributes from a collation database.

31. The computer readable medium of claim 30, further comprising the step of accessing an interface for a plurality of database engines containing information related to the intersection of the selected attributes for retrieval.

32. A computer readable medium including program instructions for organizing information for collation in a processing system which includes collation information, the program instructions for:

a) arranging the collation information in a table format which includes collation order information;

b) selecting the collation order information for a particular set of characters;

c) accessing collation tables to retrieve the selected collation order information, the table format for facilitating selecting an intersection of attributes in the collating tables; and d) using an interface to a database engine to retrieve additional information related to the selected collation order information.

33. A computer readable medium including program instructions utilizing a locale object database arranged in a table format to organize information for collation in a processing system, the program instructions for:

a) selecting a locale from the locale object database;

b) selecting a collation order within the locale;

c) selecting an attribute associated with a set of characters within the collation order for obtaining an intersection of one of the selected attributes with another of the selected attributes;

d) accessing collation tables and an interface to a database engine to retrieve the collating order if the attributes are not tagged with a prefix or the prefix does not properly determine the collation order, the table format for facilitating selecting an intersection of the attributes in the collating tables.

34. The computer readable medium of claim 33, wherein the locale is identified by language and region.

35. A method for organizing information for collating in a processing system, the method comprising:

a) determining if a first string of information uses the same encoding as a second string of information;

b) converting the first string to the encoding used in the second string if the first and second strings are encoded differently;

c) accessing an interface to a database engine for transforming one or both of the first string and the second; and d) collating the first and second strings.

36. A computer readable medium including program instructions for utilizing a locale object database to organize information for collation, the program instructions for:

a) determining if a first string of information uses the same encoding as a second string of information:

b) converting the first string to the encoding used in the second string if the first and second strings are encoded differently;

c) accessing an interface to a database engine for transforming one or both of the first string and the second; and d) collating the first and second strings.

* * * * *